(12) United States Patent
Lora et al.

(10) Patent No.: US 10,572,247 B2
(45) Date of Patent: Feb. 25, 2020

(54) PROTOTYPE MANAGEMENT SYSTEM

(71) Applicant: Dell Products L.P., Round Rock, TX (US)

(72) Inventors: Bolivar Cesar Lora, Round Rock, TX (US); Robbie Smith, Round Rock, TX (US); Shannon Jay Kennedy, Buda, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 148 days.

(21) Appl. No.: 15/170,372

(22) Filed: Jun. 1, 2016

(65) Prior Publication Data

US 2017/0351509 A1 Dec. 7, 2017

(51) Int. Cl.
*G06F 8/70* (2018.01)

(52) U.S. Cl.
CPC ..................................... *G06F 8/70* (2013.01)

(58) Field of Classification Search
CPC ........................................................ G06F 8/70
USPC ........................................................ 717/102
See application file for complete search history.

(56) References Cited

U.S. PATENT DOCUMENTS

| | | | | |
|---|---|---|---|---|
| 2002/0059054 A1* | 5/2002 | Bade | .................. | G06F 17/5022 703/20 |
| 2004/0148318 A1* | 7/2004 | Taylor | ................. | G06F 17/3089 |
| 2007/0235525 A1* | 10/2007 | Murch | ............... | H04N 1/00127 235/382 |
| 2009/0265723 A1* | 10/2009 | Mochizuki | .............. | G06F 9/485 719/328 |
| 2012/0072232 A1* | 3/2012 | Frankham | .............. | G16H 10/20 705/2 |
| 2013/0074046 A1* | 3/2013 | Sharma | ............... | G06F 11/3688 717/126 |
| 2013/0262986 A1* | 10/2013 | Leblond | .............. | G06F 17/3089 715/236 |
| 2014/0068336 A1* | 3/2014 | Naveh | ................. | G06F 11/3684 714/32 |
| 2014/0195482 A1* | 7/2014 | Kaiser | ............... | G06F 17/30581 707/620 |
| 2015/0106806 A1* | 4/2015 | Reddy | ................. | G06F 9/45533 718/1 |
| 2015/0192658 A1* | 7/2015 | Ullah | ........................ | G01S 5/04 455/456.1 |
| 2015/0220320 A1* | 8/2015 | Chen | ........................ | G06F 8/68 717/170 |
| 2016/0098250 A1* | 4/2016 | Gross | ........................ | G06F 8/20 717/109 |

\* cited by examiner

*Primary Examiner* — Emerson C Puente
*Assistant Examiner* — Sen Thong Chen
(74) *Attorney, Agent, or Firm* — Campbell Stephenson LLP; Shiv S. Naimpally (57) ABSTRACT

A prototype management system to provide cross team tools, frameworks, prototype management, and prototype tracking capabilities to improve the overall timeliness and quality of application and web-based product development. In an example, the prototype management system may be configured to cause the prototype to act as a live website that may be accessed by each of the teams and causes each team member to develop operable objects opposed to simulated objects.

21 Claims, 5 Drawing Sheets

PROTOTYPE MANAGEMENT SYSTEM

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The development of application and web-based systems has evolved to include multiple teams of designers, programmers, and developers. Additionally, many tools have been designed to assist the various teams with improving efficiency and quality of each team's specific tasks and objectives. For example, in the traditional development model, each team has developed specialized skills that are unique to their tasks and objects, leading to increased specialization and reduced understanding of the tasks and objectives typically associated with other teams. Unfortunately, today the lack of uniformity in tools and skills across application and web-based development teams often results in duplication of work, reductions in quality of work, and overall development delays.

SUMMARY

In one implementation, a prototype management system may be configured to provide cross team tools, frameworks, prototype management, and prototype tracking capabilities to improve the overall timeliness and quality of application and web-based product development. For example, the prototype manager system may be configured to unify the tools and frameworks selected by the various teams (e.g., the design team, the development team, or the programmers), thereby reducing the amount of duplicate work performed as the user interface modules created by the design team may be utilized by the development team in implementing the application or web-based code. Thus, the amount of work duplicated across teams may be reduced.

In another example, the prototype management system may be configured to cause the prototypes to act as a live website that may be accessed by each of the teams. In this manner, the design team is working with modules that may be produced as actual user interfaces in a desired language. In this manner, the design team may be aware that the user interface may actually be implemented in the desired language which is often not the case with simulated use interface design platforms. For instance, designers often provide mockup or simulated user interfaces to the programmers that may be difficult or even impossible to reproduce in the selected programming language. Thus, by providing user interface modules (or design libraries) to the designers that allow for the creating of programmable interfaces, the vision of the designers may actually be implemented by the programmers and in some cases, the designers work may act as foundational code modules usable by the programmers.

In some implementations, the prototype management system may also provide for a management to allow one or more individuals the ability to manage the prototype project across teams. For example, the prototype management system may provide version control or access controls to ensure each individual that works on the prototype is working on an active version or the most up to date version. Thus, the prototype management system may prevent the duplication of work across teams (e.g., the system may ensure a member of the design team is not altering a module currently being implemented by a member of the programming team). The prototype management system may also be configured to allow one or more individuals to publish the prototype to various locations, such as internal servers, external servers, code management servers, or other development or production servers.

The prototype management system may also provide a dashboard to each user of the prototype management system. For example, the dashboard may provide each user with updates related to each prototype the user is assigned one or more tasks. The dashboard may allow a user to create new prototypes, download or access data associated with existing prototypes, or access design libraries. The dashboard may also provide the user with updates to the design libraries, development documents, etc.

In some cases, the prototype management system may also provide a project or prototype page that allows members of each team to quickly access each page or module being developed as part of the project. In this manner, each individual assigned to the prototype development has visibility into the entire project via one convenient location.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

For purposes of this disclosure, a system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, a system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The systems may include random access memory (RAM), one or more processing resources such as a central processing unit (CPU) or hardware or software control logic, ROM, and/or other types of nonvolatile memory. Additional components of the prototype management system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

This disclosure includes techniques and implementations to improve the efficiency and quality associated with application and web-based development projects. For example, the prototype management system may be a cross-team platform or interface to provide unified tools, design components or modules, and frameworks, as well as prototype management and prototype tracking capabilities. In some examples, the prototype management system may be configured to improve the overall timeliness and quality of application and web-based product development.

In one example, the prototype management system may be configured to cause the prototype to act as a live website that may be accessed by each of the teams rather than as a simulation of a user interface or experience. In this manner, the design team is working with modules that may be produced as actual user interfaces in a desired language. In another example, the prototype management system may provide a management interface to allow one or more individuals the ability to manage the prototype project across the various teams. For instance, the prototype management system may provide version control or access controls to ensure each individual that works on the prototype is working on an active version or the most up to date version. In another example, the prototype management system may also be configured to allow one or more individuals to publish the prototype to various locations, such as internal servers, external servers, code management servers, or other development or production servers. In some cases, the prototype management system may also provide a dashboard to each user of the prototype management system to provide each user with updates related to prototypes, create new prototypes, download or access data associated with existing prototypes, or access design libraries. In some cases, the prototype management system may also provide a project or prototype page that allows members of each team to quickly jump to each page or module being developed as part of the prototype. For example, the prototype may include one feature of a site or application, such as a button or other graphic user interface (GUI) features, code module, process, a combination thereof, or an entire site or application.

In one implementation, the prototype management system may include prototype management engine that provides individual users with access to the prototype, various design modules, frameworks, etc. and allows at least some individuals to manage the project and/or publish the project to various servers. For instance, the prototype management engine may be communicatively coupled to a sandbox environment, external development and production servers, internal development and production servers, and/or various code management servers (such as Git server).

The prototype management system may also include a tracking engine to track versions and access to the various modules being developed as part of the prototype and/or published to the various servers. For example, the prototype tracking engine may prevent access to a module or components of the prototype currently being viewed, edited, or updated by another member of any team assigned to the project. Thus, the prototype management system may provide cross-team version control and prevent duplication of work that results when a designer edits a module already under development by a programmer.

The prototype management system may also include stored frameworks, design libraries and modules that may be selected and arranged by a designer. For example, the designer may utilize the design libraries and modules to create user interfaces that operate as live websites rather than as still images or simulations. Thus, the designer may be able to determine from the modules if the programmers will be able to implement the design in the manner intended using the selected programming language.

Figure 1:
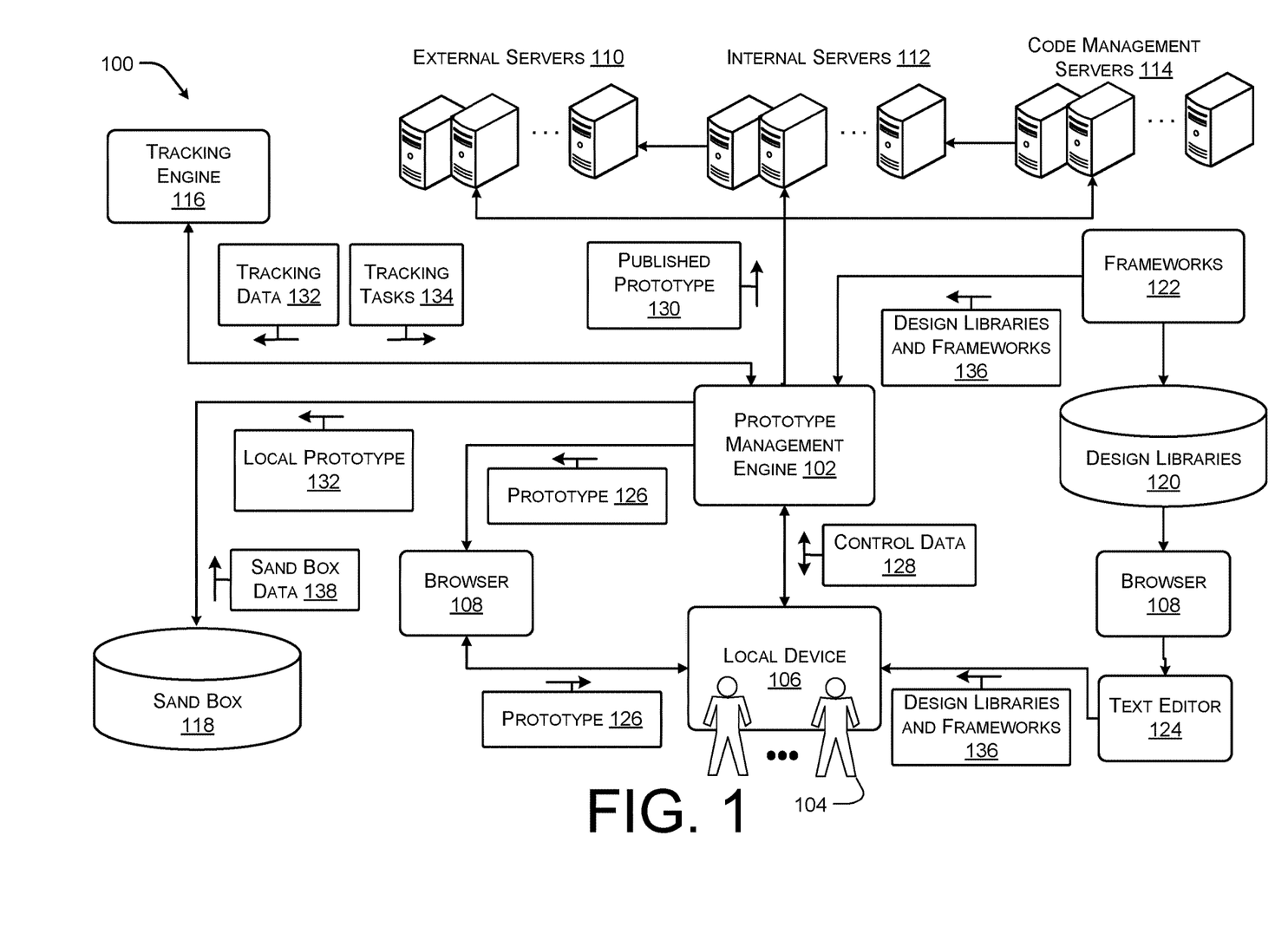
FIG. 1 illustrates an example system including a prototype management engine 102 according to some implementations.

FIG. 1 illustrates an example system 100 including a prototype management engine 102 according to some implementations. As discussed above, the system 100 may be configured to allow individuals (such as designers and programmers), generally indicated by 104, assigned to one or more prototype development projects to access each prototype via a user device or local device 106 using the prototype management engine 102. For instance, the prototype management engine 102 may be accessible using the local device 106 via a web-browser, generally indicate by 108, to allow the individuals 104 to access to view, edit, or otherwise interact with the prototypes. In some cases, by providing a web-based prototype management engine 102, each prototype act as a live website during each stage of development (including the design phase). In this manner, the design team is developing modules that may be leveraged by the programmers in implementing actual user interfaces in a desired language.

In the illustrated example, the system 100 includes external servers 110, internal servers 112, and code management servers 114 that may be utilized to host the prototype page and/or various prototypes in a manner that may be accessible to various parties. In some cases, the prototype management engine 102 may include specialized API packages that allow each of the external servers 110, internal servers 112, and code management servers 114 to exchange data and/or code with the prototype management engine 102. The APIs may be specific to particular ones of the external servers 110, internal servers 112, and code management servers 114 or shared between multiple servers.

By introducing the prototype management engine 102 between the designers, programmers and others involved with development, a tracking engine 116 may be utilized to monitor interactions with the prototype and ensure version control and access. For example, the tracking engine 116 may prevent two users from accessing or modifying the same module at the same time to prevent inadvertent duplication of work or overwriting of work. Similarly, the tracking engine 116 may track hours associated with the development, individuals assigned to each prototype, feature of a prototype, and/or module of a prototype to develop metric data associated with the development of each prototype, feature, and/or module. In some cases, the tracking engine 116 may also ensure version control and/or maintenance of backup data to prevent inadvertent loss.

The system 100 may also include sand box 118 which may be utilized by the individuals assigned to each prototype to test and develop the web-site or application. For example, the user may publish the prototype to the sandbox 118 as a local version that the user may use to continue development of the prototype separate from other users.

In the illustrated example, the system 100 also includes design libraries 120 and frameworks 122 that may be accessed by the individuals 104 developing the prototypes using the browser 108 associated with the prototype management engine 102. For example, in some instances, the libraries 120 and the frameworks 122 available to each individual may be selected on a per company, per project, per prototype, per feature, or per module level by an administrator or manager assigned to the prototype development efforts. In one specific example, the design libraries 120 and the frameworks 122 may be selected during an initiation or setup phase associated with the original implementation of the system 100 by a company or entity.

In some implementations, the design libraries 120 and the frameworks 122 are selected to force each individual associated with the prototype development to utilize uniform modules and features. For example, the design libraries 120 and the frameworks 122 may be selected to operate within a desired programming language in which the prototype is being developed. In this manner, the work product of the designers may result in operable code modules instead of simulated graphical representations of a desired end product. Additionally, as the designers have continued exposure to the design libraries 120 and the frameworks 122, the designers will develop a better understanding of the operations of the actual code, thereby, improving the work product of the designers. Thus, the system 100 allows for reduction in development time as the programmers no longer re-write code based on the graphical representation and the work product of the designers is actually capable of being implemented in the selected programming language.

In the illustrated example, the system 100 also includes a text editor 124 that may be accessible or presented to the individual 104 associated with the prototype via the local device 106 in conjunction with the browser 108. In this example, the individual 104 regardless of programming experience may edit the particular prototype, feature, and/or module being viewed. For example, the design libraries may include a user interface that allows the individual 104 to edit the look and feel, operation, or interaction with a GUI feature in a manner that edits the base code to generate a working GUI feature.

In one particular example, a user 104 may access a prototype 126 via the browser 108 viewable on the local device 106 by exchanging control data 128 with the prototype management engine 102. For example, the control data 128 may include commands to open or launch a prototype (such as prototype 126), create or generate a new prototype, edit content or data associated with a prototype, configure settings, libraries 120, or frameworks 122, configure user or individual access to the prototype management engine 102, among others.

The prototype 126 may then be viewed and edited by the user 104 via the browser. The user 104 may also issue a control data 128 to cause the prototype 126 to be published as a published prototype 130 to one of the servers 110, 112, or 114. The prototype 126 may also be published as a local prototype 132 using the sand box data 118. For example, the local prototype 132 may be published to the sand box 118 such that the sand box data 138 may be utilized to test the operations of the local prototype 132 in a manner that may be tracked by the user 104 to, for instance, identify and remove bugs or other issues with the prototype 126. In some examples, the sand box data 138 may include test data, sample use cases, training data, corpus data, web-crawler data, survey data, among others that may be used to test operations or capabilities of the site or application. In some cases, the sand box data 138 may also be utilized to stress test the sand box 118 or the servers 110 and/or 112 hosting the site or application to determine if the servers 110 and/or 112 are capable of meeting or exceeding end user demand levels or thresholds.

As each version of the prototype 126 is viewed, edited, and published to the various servers 110, 112, and 114 and sand boxes 118, the tracking engine 116 may receive tracking data 132 associated with each version of the prototype 126 and the edits being made by the user 104 via the local device 106 and the browser 108. The tracking engine 116 may in response issue tracking task 134 to the prototype management engine 102. For example, the tracking task 134 may include locking version of the prototype 126 from access to other users, collecting test and error data associated with the prototype, recording the user 104 that accessed the prototype 126 and a length of time associated with the access, as well as other access and version control tasks.

Additionally, at various times design libraries 120 and frameworks 122 may be added to the system 100. In these cases, the prototype management engine 102 may receive design libraries and frameworks 136. The prototype management engine 102 may then provide an update or other information related to the new design libraries and frameworks 136 to the user 104.

Figure 2:
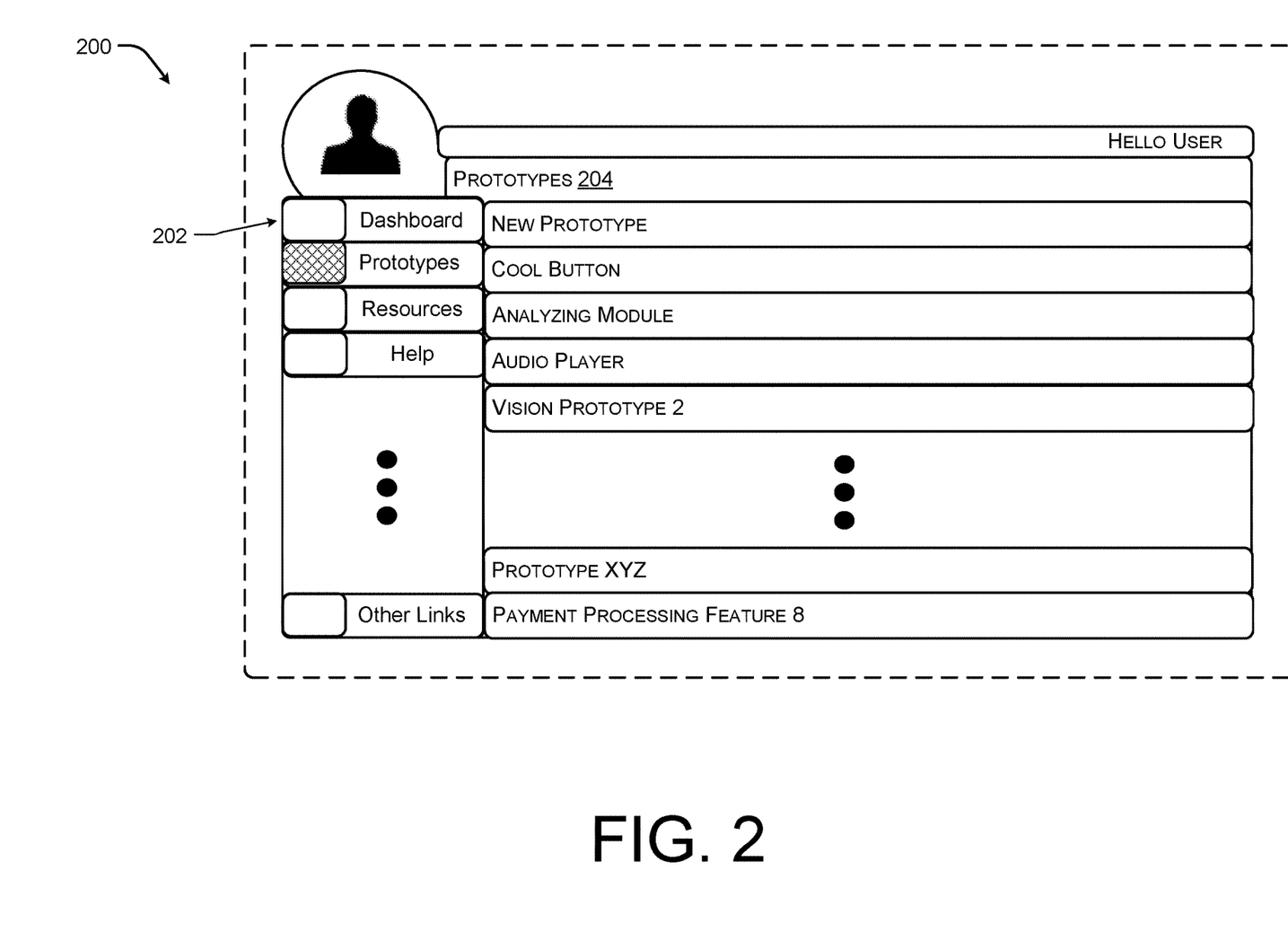
FIG. 2 illustrates an example prototype page for providing individuals access to prototypes under development according to some implementations.

FIG. 2 illustrates an example prototype page 200 for providing individuals access to prototypes under development according to some implementations. For instance, in some examples, the prototype management system may provide a project or prototype page to allow individuals accessing the prototype management system to quickly jump to each prototype, feature, or module being developed. In this manner, each individual assigned to one or more prototype development project has access to the each page of each project via one convenient location.

In the illustrated example, the prototype page 200 includes menu selector section 202 to allow the individual viewing the prototype page 200 to access different features of the prototype management system. For instance, as illustrated the menu 202 includes links to a dashboard page, the prototype page 200, resources (such as design libraries and frameworks that may be accessible to the individuals), help (such as remote desktop help, library and framework examples and explanations, etc.) as well as other links.

The prototype page 200 also includes a prototype list section 204 that includes a plurality of selectable items that allow the individual to access various features, modules, and prototypes in a manner in which the feature, module, or prototype may be viewed, edited, tested, or otherwise manipulated as an actual working feature in the programming language selected for the project. Thus, the prototype page 200 may act as a single location for accessing each of the features, modules, and prototypes currently assigned to the individual for development.

Figure 3:
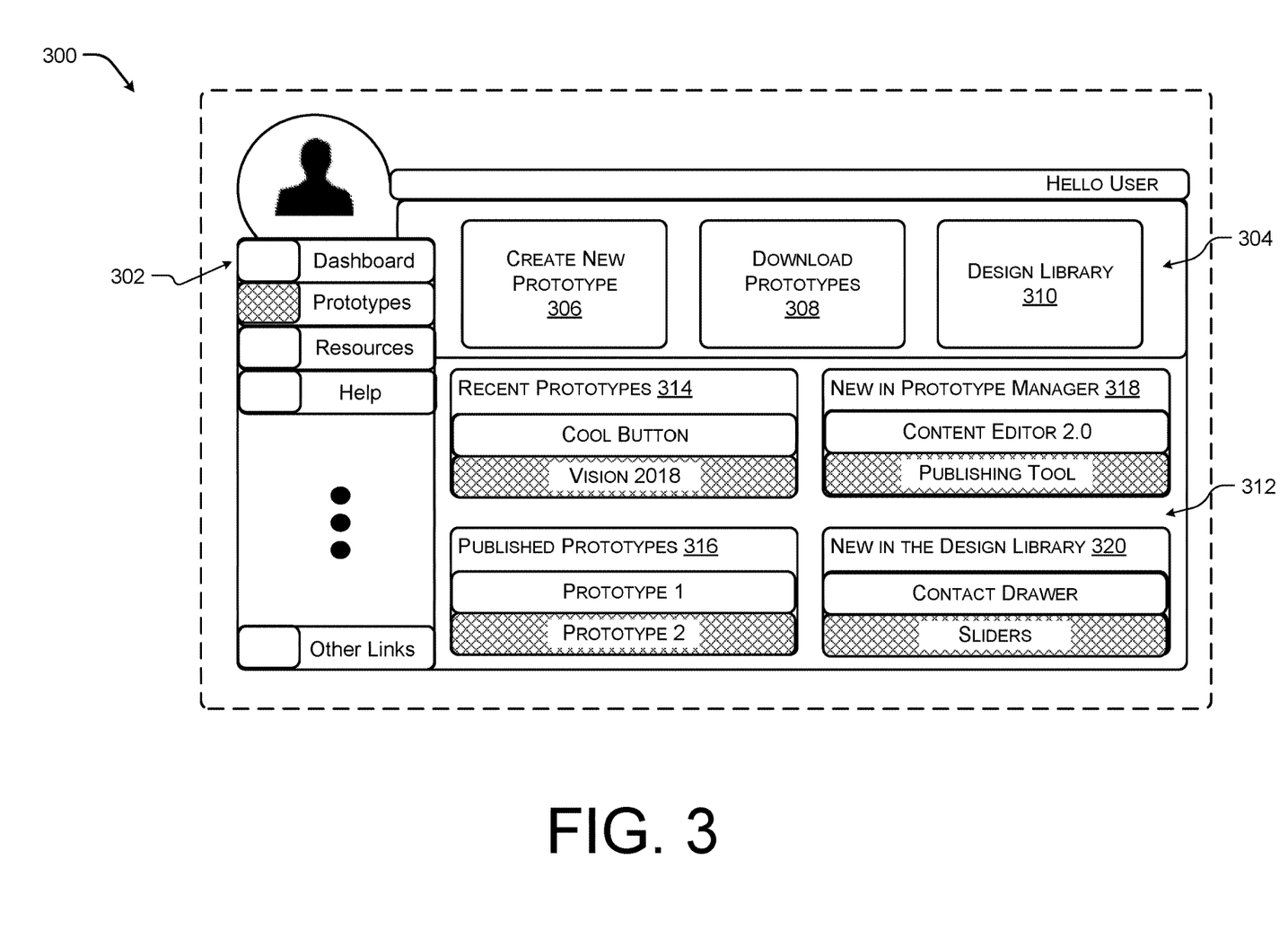
FIG. 3 illustrates an example dashboard page for providing individuals access to prototypes under development according to some implementations.

FIG. 3 illustrates an example dashboard page 300 for providing individuals access to prototypes under development according to some implementations. In some examples, the prototype management system may provide individual users with access to the prototype, various design modules, frameworks, as described above, and allows at least some individuals to manage the project and/or publish the project to various servers. For instance, a user may have access to a sandbox environment, external development and production servers, internal development and production servers, and/or various code management servers (such as Git server) via a prototype management engine. In other examples, a tracking engine may track versions and access to the various modules being developed as part of a prototype published to the various servers. In still other examples, the prototype management system may include stored frameworks, design libraries and modules that may be selected and utilized by a designer. For example, the designer may utilize the design libraries and modules to create user interfaces that operate as live websites rather than as still images or simulations. In some implementations, the dashboard page 300 allows the user to access the frameworks, design libraries, tracking features, publication severs, and sand box data.

In the illustrated example, the dashboard page 300 includes a menu selector section 302 to allow the individual viewing the dashboard page 300 to access different features of the prototype management system. For instance, as illustrated the menu 302 includes links to a dashboard page 300, the prototype page, resources (such as design libraries and frameworks that may be accessible to the individuals), help (such as remote desktop help, library and framework examples and explanations, etc.) as well as other links.

The dashboard page 300 also includes a dashboard section 304 to allow the user to access various features, modules, frameworks, or libraries provided by the prototype management system, to create new prototypes, to download data associated with existing prototypes among others. For instance, in the illustrated example, the dashboard section 304 includes a create new prototype selector 306 to allow a user to create a new prototype web-site, application, or module for use with a web-site or application. The dashboard section 304 also includes a download prototype selector 308 to allow a user to download data, features, and modules under development for an existing prototype web-site or application. The dashboard section 304 further includes a design libraries selector 310 for allowing a user to browse and select from the various design libraries and frameworks associated with an active prototype.

The dashboard page 300 may also include an notification section 312. The notification section 312 may include a list of recently accessed prototypes 314, a list of published prototypes 316, a list of new prototypes added to the prototype management system, a list of new design libraries added to the prototype management system, among other user accessible lists. In this manner, the notification section 312 may provide the user with information about updates and changes to the system as well as to each prototype being developed using the system.

Figure 4:
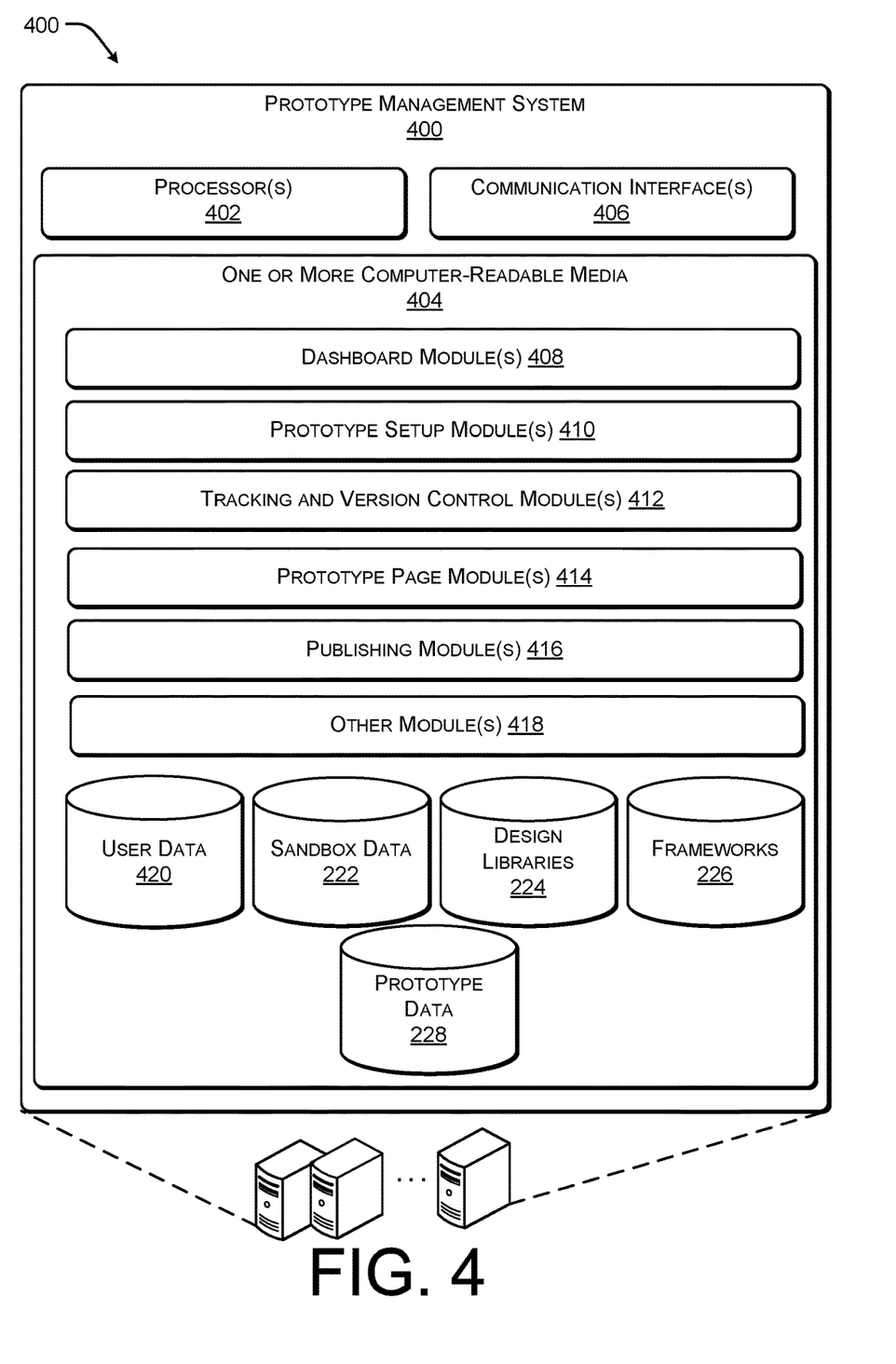
FIG. 4 illustrates example components of one or more servers associated with the management system according to some implementations.

FIG. 4 illustrates example components of one or more servers associated with the prototype management system 400 according to some implementations. The servers, which host the prototype management system 400 collectively comprise processing resources, as represented by processors 402, and computer-readable storage media 404. The computer-readable storage media 404 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

The servers may also include one or more communication interfaces 406, which may support both wired and wireless connection to various networks, such as cellular networks, radio (e.g., radio-frequency identification RFID), WiFi networks, short-range or near-field networks (e.g., Bluetooth®), infrared signals, local area networks, wide area networks, the Internet, and so forth. For example, the communication interfaces 406 may allow the prototype management system 400 to facilitate the prototype management with various publication servers, tracking engines, libraries and databases, and user devices, as illustrated with respect to FIG. 1.

Several modules such as instruction, data stores, and so forth may be stored within the computer-readable media 404 and configured to execute on the processors 402. For example, a dashboard module 408, a prototype setup module 410, a tracking and version control module 412, prototype page module 414, publishing module 416 as well as other modules 418. In some implementations, the computer-readable media 404 may store data, such as user data 420, sand box data 422, design libraries 424, frameworks 426, and prototype data 428.

The user data 420 may include permission, access settings, prototype assignments, titles, job descriptions, skill sets (such as known programming languages), location, etc. about a user. The sand box data 422 may include data that can be used to test or alter the prototypes during the development stage. The design libraries 424 and frameworks 426 may include predefined objects that may be utilized by the designers and programmers to construct GUIs, mock-ups, modules, and features that operate a real code rather than in a simulated environment. The prototype data 228 may include the prototype, any module or feature being developed for a prototype, access data, version data, control data, user assignment data, development data, history data, among other data.

The dashboard module 408 may be configured to allow individual users with access to the prototype, various design modules, frameworks to manage the prototype and/or publish the project to various servers. For instance, a user may have access to a sandbox environment, external development and production servers, internal development and production servers, and/or various code management servers (such as Git server) via a dashboard module. In other examples, the dashboard module 408 allows the user to access the frameworks, design libraries, tracking features, publication severs, and sand box data from one access point and notify users to changes with regards to the frameworks, design libraries, tracking features, publication severs, and sand box data.

The prototype setup module 410 may be configured to allow an administrator or manager associated with a prototype project to select various frameworks, design libraries, and sand box data that is accessible to the various individual users assigned to complete the task. In some cases, the prototype setup module 410 may be used to configure the prototype management system 400 over all projects (e.g., at a company, division, team, etc. level) rather than at the individual project level. For example, the company may select preferred programming language and frameworks that are to be used throughout all development projects at the company to, for instance, ensure each user is familiar with the same programming language and features. In this manner, the company may improve efficiency of development across skill sets.

The tracking and version control module 412 may be configured to version each copy of a prototype, module, or feature that is modified, checked in, checked out, or otherwise accesses the prototype, module, or feature together with an identifier associated with the individual accessing the prototype. The tracking and version control module 412 may also lock the prototypes with different levels (e.g., read, write, read and write, etc.) when receiving an access request by a second individual.

The prototype page module 414 may allow individuals accessing the prototype management system to quickly jump to each prototype, feature, or module being developed. For example, the prototype page 414 may include a list of prototypes that may act as a link to open the prototype within a browser of a local device being used to access the prototype management system. In this manner, each individual assigned to one or more prototype development project has access to the each page of each project via one convenient location.

The publishing module 416 may allow the publication of prototypes to various locations including a local sand box for testing and development, internal servers, and external servers. In some cases, the publishing module 416 may allow the user to select sand box data 222 or test data that may be utilized to test the prototype on the local sand box environment.

Figure 5:
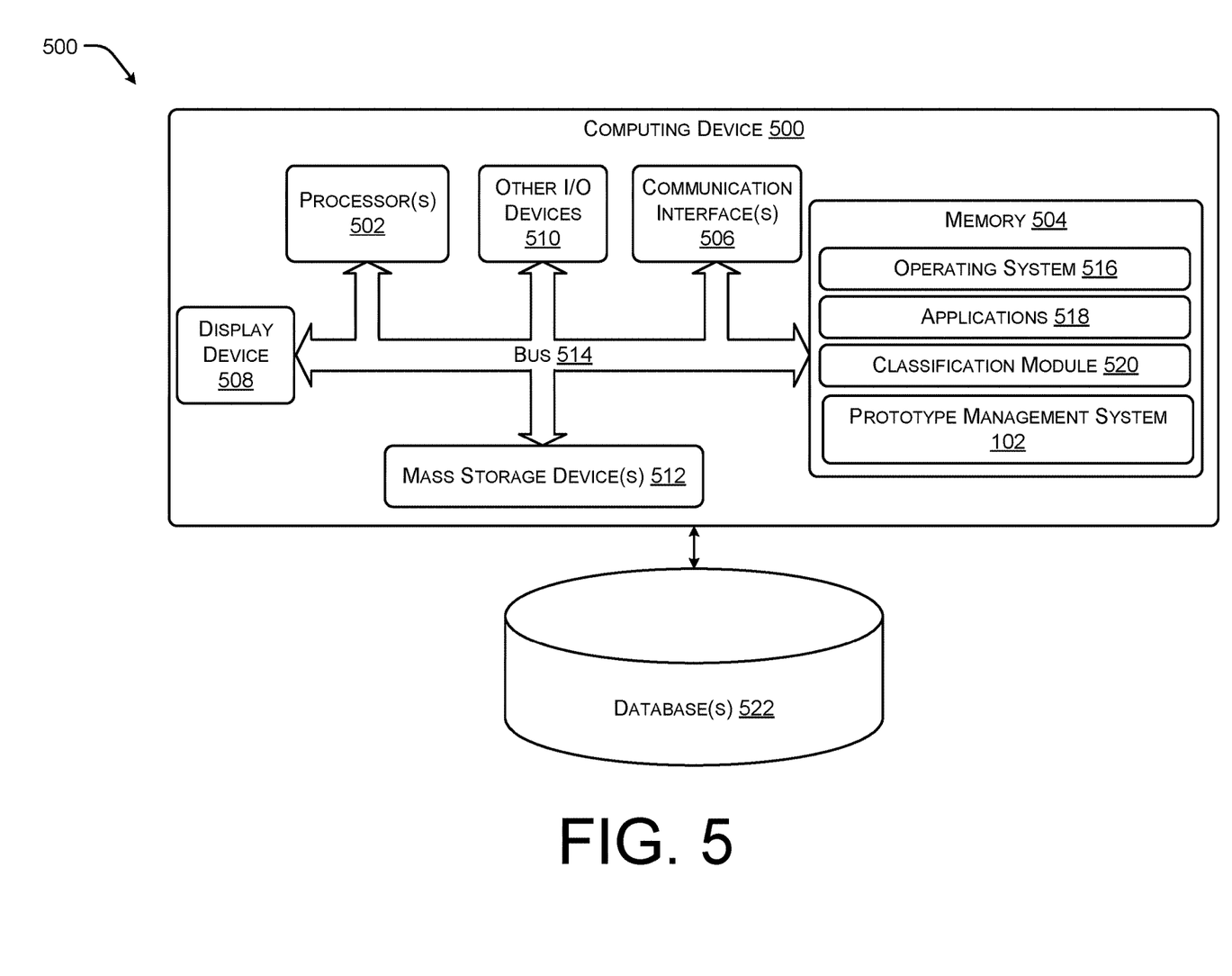
FIG. 5 illustrates an example configuration of a computing device that can be used to implement the systems and techniques described herein.

FIG. 5 illustrates an example configuration of a computing device 500 that can be used to implement the systems and techniques described herein. The computing device 500 may include one or more processors 502, a memory 504, communication interfaces 506, a display device 508, other input/output (I/O) devices 510, and one or more mass storage devices 512, configured to communicate with each other, such as via a system bus 514 or other suitable connection. In some implementations, the computing device 500 may be representative of the classification component discussed above.

The processor 502 is a hardware device (e.g., an integrated circuit) that may include a single processing unit or a number of processing units, all or some of which may include single or multiple computing units or multiple cores. The processor 502 can be implemented as one or more microprocessors, microcomputers, microcontrollers, digital signal processors, central processing units, state machines, logic circuitries, and/or any devices that manipulate signals based on operational instructions. Among other capabilities, the processor 502 can be configured to fetch and execute computer-readable instructions stored in the memory 504, mass storage devices 512, or other computer-readable media.

Memory 504 and mass storage devices 512 are examples of computer storage media (e.g., memory storage devices) for storing instructions which are executed by the processor 502 to perform the various functions described above. For example, memory 504 may generally include both volatile memory and non-volatile memory (e.g., RAM, ROM, or the like) devices. Further, mass storage devices 512 may include hard disk drives, solid-state drives, removable media, including external and removable drives, memory cards, flash memory, floppy disks, optical disks (e.g., CD, DVD), a storage array, a network attached storage, a storage area network, or the like. Both memory 504 and mass storage devices 512 may be collectively referred to as memory or computer storage media herein, and may be a media capable of storing computer-readable, processor-executable program instructions as computer program code that can be executed by the processor 502 as a particular machine configured for carrying out the operations and functions described in the implementations herein.

The computing device 500 may also include one or more communication interfaces 506 for exchanging data with other devices of the system via a network. The communication interfaces 506 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 506 can also provide communication with external storage (not shown), such as in a storage array, network attached storage, storage area network, or the like.

A display device 508, such as a monitor may be included in some implementations for displaying information and images to users. Other I/O devices 510 may be devices that receive various inputs from a user and provide various outputs to the user, and may include a keyboard, a remote controller, a mouse, a printer, audio input/output devices, and so forth.

The computer storage media, such as memory 504 and mass storage devices 512, may be used to store software and data. For example, the computer storage media may be used to store an operating system 516 and one or more other applications 518. The computer storage media may also store one or more modules associated with delegation activities, generally illustrated as prototype management system 102. In some cases, the communication interfaces 506 may allow the computing device 500 to receive data from one or more databases 522.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, and can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Software modules include one or more of applications, bytecode, computer programs, executable files, computer-executable instructions, program modules, code expressed as source code in a high-level programming language such as C, C++, Perl, or other, a low-level programming code such as machine code, etc. An example software module is a basic input/output system (BIOS) file. A software module may include an application programming interface (API), a dynamic-link library (DLL) file, an executable (e.g., .exe) file, firmware, and so forth.

Processes described herein may be illustrated as a collection of blocks in a logical flow graph, which represent a sequence of operations that can be implemented in hardware, software, or a combination thereof. In the context of software, the blocks represent computer-executable instructions that are executable by one or more processors to perform the recited operations. The order in which the operations are described or depicted in the flow graph is not intended to be construed as a limitation. Also, one or more of the described blocks may be omitted without departing from the scope of the present disclosure.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A prototype management engine comprising:
a communication interface;
one or more processors; and
one or more non-transitory computer-readable storage media storing computer-executable instructions, which when executed by one or more processors, cause the one or more processors to:
receive a request to access a prototype software system from a user device, the prototype software system used to develop software prototypes prior to placing them in service;
determine that the prototype software system is available;
launch the prototype software system as a local prototype in a sandbox environment that is separate from other users;
cause the sandbox environment to use sandbox data to stress test the prototype software system to determine that the prototype software system is capable of at least meeting end user demand thresholds;
cause the local prototype to open in a browser associated with the user device, the local prototype comprising software instructions that are incorporated into at least one of:
a software object associated with a website or application;
a software module associated with a website or application;
a software-implemented feature associated with a website or application;
a software-implemented website; or
a software application;
cause a text editor to open in conjunction with the browser, the text editor to allow software instructions of the local prototype to be modified;
transfer data associated with a plurality of design libraries between a designs library database and the user device, individual ones of the design libraries usable to generate a module associated with the local prototype;
transfer data associated with a plurality of frameworks between a frameworks database and the user device, individual ones of the design libraries usable to edit the local prototype;
store the local prototype as a current version of the local prototype;
provide a dashboard to be displayed on the user device, wherein the dashboard comprises:
a dashboard section comprising:
a first module to allow a user to create a new software prototype;
a second module to allow a user to download data for an existing software prototype; and
a third module to allow a user to browse and select from a plurality of libraries and frameworks; and
a notification section comprising:
a set of accessed software prototypes;
a set of published software prototypes;
a set of new prototypes added to the prototype management engine; and
a set of new design libraries added to the prototype management engine;
receive, by the dashboard, update information associated with the prototype software system, the plurality of design libraries, and the plurality of frameworks;
determine that a second prototype has been modified by second user device to create a modified prototype;
send tracking information associated with the modified prototype to a tracking engine; and
send, by the tracking engine, a notification to the user device indicating that the second prototype has been modified.

2. The prototype management engine as recited in claim 1, wherein the computer-executable instructions, when executed by the one or more processors, further cause the one or more processors to:
receive, a notification related to a new design library via the communication interface; and
cause the communication interface to send a notification related to the new design library to the user device.

3. The prototype management engine as recited in claim 1, wherein the computer-executable instructions, when executed by the one or more processors, further cause the one or more processors to:
receive, a notification related to a new framework via the communication interface; and
cause the communication interface to send a notification related to the new framework to the user device.

4. The prototype management engine as recited in claim 1, wherein the computer-executable instructions, when executed by the one or more processors, further cause the one or more processors to:
receive, a publication request from the user device; and
cause the current version of the local prototype to publish to a server.

5. The prototype management engine as recited in claim 4, wherein the server is at least one of an internally accessible server or an external accessible server, and wherein each of the designs libraries operates a functioning module when rendered in the browser.

6. The prototype management engine as recited in claim 1, wherein the computer-executable instructions, when executed by the one or more processors, further cause the one or more processors to:
send tracking data to a tracking engine; and
receive tracking commands that include instructions to store the local prototype as the current version.

7. The prototype management engine as recited in claim 1, wherein the sandbox data includes web-crawler data and survey data, and wherein stress testing the prototype software system includes stress testing the sandbox environment.

8. A system comprising:
one or more processors;
one or more non-transitory computer-readable storage media to store instructions that are executable by the one or more processors, the instructions comprising:
a prototype management engine to manage development of a prototype comprising software instructions used to create a prototype website;
a design library database to store a plurality of design libraries and frameworks accessible to a local device via a browser, each of the plurality of design libraries and frameworks operable as a function object within the browser;
a sandbox to host a local version of the prototype website associated with the local device, the sandbox using sandbox data to stress test the system to determine that the prototype management engine is capable of at least meeting end user demand thresholds;
a publication server to:
host a published version of the prototype website; and
publish, based on receiving a publish command, the prototype website to at least one of an internal server, an external server, a code management server, a development server, or a production server;
a tracking engine to:
manage version control of the prototype website;
manage the published version of the prototype website;
update version information associated the prototype website;
determine that the prototype website has been modified; and
send a notification to the local device indicating that the prototype website has been modified; and
a dashboard, wherein the dashboard comprises:
a dashboard section comprising:
a first module to allow a user to create a new software prototype;
a second module to allow a user to download data for an existing software prototype; and
a third module to allow a user to browse and select from a plurality of libraries and frameworks; and
a notification section comprising:
a set of accessed software prototypes;
a set of published software prototypes;
a set of new prototypes added to the system; and
a set of new design libraries added to the system.

9. The system as recited in claim 8, wherein the sandbox data includes web-crawler data, wherein the sandbox hosts a second local version of the prototype website that is accessible to a second local device and inaccessible to other local devices, and wherein stress testing the system includes stress testing the sandbox.

10. The system as recited in claim 8, wherein the dashboard allows a user to receive update information associated with the prototype website and the plurality of design libraries and frameworks.

11. The system as recited in claim 8, wherein the prototype management engine provides a prototype page to the local device, the prototype page to allow a user to open the prototype website within the browser.

12. A non-transitory computer-readable storage media storing instructions, that when executed by one or more processors, cause the one or more processors to:
receive a request to access a prototype from a user device, the prototype hosted by a prototype software system used to develop software prototypes;
launch the prototype as a local prototype in a sandbox environment;
cause the sandbox environment to use sandbox data to stress test the prototype software system to determine that the prototype software system is capable of at least meeting end user demand thresholds;
cause the local prototype to open in a browser associated with the user device, the local prototype comprising software instructions that are incorporated into at least one of:
a software object associated with a website or application;
a software module associated with a website or application;
a software-implemented feature associated with a website or application;
a software-implemented website; or
a software application;
cause a text editor to open in conjunction with the browser, the text editor to allow software instructions of the local prototype to be modified;
transfer data associated with a plurality of design libraries between a designs library database the user device, individual ones of the design libraries usable to generate a module associated with the local prototype;
transfer data associated with a plurality of frameworks between a frameworks database and the user device, individual ones of the design libraries usable to edit the local prototype;
store the local prototype as a current version of the prototype to create a current prototype;
provide a dashboard to be displayed on the user device, the dashboard to receive update information associated with the prototype software system, the plurality of design libraries, and the plurality of frameworks, wherein the dashboard comprises:
a dashboard section comprising:
a first module to allow a user to create a new software prototype;
a second module to allow a user to download data for an existing software prototype; and
a third module to allow a user to browse and select from a plurality of libraries and frameworks; and
a notification section comprising:
a set of accessed software prototypes;
a set of published software prototypes;
a set of new prototypes added to the prototype software system; and a set of new design libraries added to the prototype software system;
determine that the current prototype has been modified to create a modified prototype; and
send a notification of the modified prototype to the user device.

13. The non-transitory computer-readable storage media as recited in claim 12, wherein the instructions, when executed by the one or more processors, further cause the processors to:
receive, tracking data from a tracking engine indicating the prototype is unlocked and available for editing.

14. The non-transitory computer-readable storage media as recited in claim 12, wherein the instructions, when executed by the one or more processors, further cause the processors to:
receive, a publication request from the user device; and
cause the current version of the prototype to publish to a server.

15. The non-transitory computer-readable storage media as recited in claim 12, wherein the instructions, when executed by the one or more processors, further cause the processors to:
send tracking data to a tracking engine; and
receive tracking commands that include instructions to store a local version as a current version.

16. The non-transitory computer-readable storage media as recited in claim 12, wherein the instructions, when executed by the one or more processors, further cause the processors to:
receive, a notification related to a new framework via a communication interface; and
cause the communication interface to send a notification related to the new framework to the user device.

17. The non-transitory computer-readable storage media as recited in claim 12, wherein the instructions, when executed by the one or more processors, further cause the processors to:
receive, a notification related to a new design library via a communication interface; and
cause the communication interface to send a notification related to the new design library to the user device.

18. The non-transitory computer-readable storage media as recited in claim 12, wherein each of the plurality of frameworks operates a functioning code when rendered in the browser.

19. The non-transitory computer-readable storage media as recited in claim 12, wherein each of the designs libraries operates a functioning module when rendered in the browser.

20. The prototype management engine as recited in claim 4, wherein the sandbox data includes corpus data, web crawler data, test data, training data, and sample use cases, and wherein stress testing the prototype software system includes stress testing the server.

21. The prototype management engine as recited in claim 1, wherein the computer-executable instructions, when executed by the one or more processors, further cause the one or more processors to:
cause the sandbox data, after the stress test, to be tracked by the user device so that the user device is able to remove bugs associated with the local prototype.

* * * * *